(12) United States Patent
Suzuki et al.

(10) Patent No.: US 7,268,449 B2
(45) Date of Patent: Sep. 11, 2007

(54) LINEAR ACTUATOR HAVING MECHANISM FOR STOPPING LINEAR MOVEMENT OF OUTPUT SHAFT WITHOUT TOUCHING ROTOR

(75) Inventors: Yuzuru Suzuki, Shizuoka (JP); Shinji Tamaki, Shizuoka (JP)

(73) Assignee: Minebea Co., Ltd., Nagaho (JP)

( * ) Notice: Subject to any disclaimer, the term of this patent is extended or adjusted under 35 U.S.C. 154(b) by 70 days.

(21) Appl. No.: 10/788,004

(22) Filed: Feb. 25, 2004

(65) Prior Publication Data

US 2004/0164624 A1  Aug. 26, 2004

(30) Foreign Application Priority Data

Feb. 26, 2003 (JP) ............... 2003-050097

(51) Int. Cl.
*H02K 41/00* (2006.01)
*H02K 7/06* (2006.01)
*H02K 7/10* (2006.01)
*H02K 1/12* (2006.01)

(52) U.S. Cl. ............... 310/12; 310/257; 310/80; 310/20

(58) Field of Classification Search ............... 310/12, 310/257, 80, 20
See application file for complete search history.

(56) References Cited

U.S. PATENT DOCUMENTS

| | | | | |
|---|---|---|---|---|
| 3,680,761 A | * | 8/1972 | Rozmus et al. ............... 228/3.1 |
| 4,751,411 A | * | 6/1988 | Fukaya et al. ............... 310/49 R |
| 4,764,696 A | * | 8/1988 | Fukaya et al. ............... 310/49 R |
| 4,942,325 A | * | 7/1990 | Fukaya ............... 310/257 |
| 5,949,168 A | * | 9/1999 | Dieckmann et al. ............... 310/75 R |
| 6,081,051 A | * | 6/2000 | Kitazawa et al. ............... 310/20 |
| 6,116,106 A | * | 9/2000 | Miyoshi ............... 74/89.37 |
| 6,362,547 B1 | * | 3/2002 | Peterson et al. ............... 310/80 |
| 6,531,798 B1 | * | 3/2003 | Palmero ............... 310/112 |
| 6,603,229 B1 | * | 8/2003 | Toye, IV ............... 310/90 |
| 6,806,602 B2 | * | 10/2004 | Hilzinger et al. ............... 310/77 |
| 2001/0002546 A1 | * | 6/2001 | Miyoshi et al. ............... 72/104 |
| 2004/0164623 A1 | * | 8/2004 | Suzuki et al. ............... 310/12 |

FOREIGN PATENT DOCUMENTS

| | | |
|---|---|---|
| DE | 19730111 A1 | 8/1998 |
| JP | H06-335228 | 12/1994 |
| JP | 07274472 A * | 10/1995 |
| JP | 11-155275 | 6/1999 |
| JP | 2000276927 A * | 10/2000 |
| JP | 2001-95192 | 4/2001 |

* cited by examiner

*Primary Examiner*—Darren Schuberg
*Assistant Examiner*—Erik Preston
(74) *Attorney, Agent, or Firm*—Townsend and Townsend and Crew LLP

(57) ABSTRACT

A stopper member is included in a linear actuator comprising a stator assembly, a rotor assembly, an output shaft, and a stopper pin which is fixedly disposed at a frontward portion of the output shaft, and which is adapted to axially control the mode and amount of movement of the output shaft initiated by rotation of the rotor assembly. The stopper member is disposed fixedly with respect to the stator assembly and stops the axial movement of the output shaft without making it happen that the stopper pin which moves together with the output shaft touches the rotor assembly.

3 Claims, 3 Drawing Sheets

LINEAR ACTUATOR HAVING MECHANISM FOR STOPPING LINEAR MOVEMENT OF OUTPUT SHAFT WITHOUT TOUCHING ROTOR

BACKGROUND OF THE INVENTION

1. Field of the Invention

The present invention relates to a linear actuator.

2. Description of the Related Art

FIG. 3 is a schematic cross sectional view of a conventional linear actuator. The linear actuator of FIG. 3 comprises a stator assembly 10, a rotor assembly 20, a rear end cap 30, an output shaft 40, and a front end cap 50.

The stator assembly 10 is composed of two stator units, one of which is structured such that two stator yokes 13a, 13b shaped into a ring oppose each other so as to sandwich therebetween a bobbin 12 having a winding 11 provided therearound, and the other of which is structured such that two stator yokes 16a, 16b shaped into a ring oppose each other so as to sandwich therebetween a bobbin 15 having a winding 14 provided therearound. The two stator units structured as above are coaxially stacked on each other forming a hollow-cylinder looking like a doughnut. The stator yokes 13a, 13b each have an array of pole teeth and are coupled to each other with their respective pole teeth intermeshing with each other. In the same way, the stator yokes 16a, 16b each have an array of pole teeth and are coupled to each other with their respective pole teeth intermeshing with each other. The pole teeth constitute the inner circumference of the stator assembly 10. The windings 11, 14 are responsible for exciting the pole teeth. The stator yokes 13a, 13b, and 16a, 16b, and the bobbins 12, 15 are integrally fixed together by resin injection-molding.

The rotor assembly 20 is housed in the stator assembly 10. The rotor assembly 20 is composed of a rotor magnet 21, and a resin segment 22, and is shaped into a hollow-cylinder. The rotor magnet 21 has a plurality of magnetic poles, and constitutes the outer circumference of the rotor assembly 20 thus opposing the pole teeth of the stator assembly 10 with a predetermined gap therebetween. The resin segment 22 is shaped tube-like, and disposed inside the rotor magnet 21, and a female screw 23 is fixedly attached inside the resin segment 22.

The rear end cap 30 is disposed at the rear end face of the stator assembly 10 so as to cover the hollow of the stator assembly 10. The rear end cap 30 has a cavity 31 at its inner side facing the rotor assembly 20 and has a rear ball bearing 32 fitted into a circular recess formed coaxially with the cavity 31. The ball bearing 32 supports rotatably the rear end portion of the rotor assembly 20.

The output shaft 40 is shaped round in its cross section, has a male screw 41 formed at its rear end portion, has a stopper pin 24 disposed at its frontward portion, and has its rearward portion inserted through the rotor assembly 20. The male screw 41 engages threadedly with the female screw 23 of the rotor assembly 20, whereby the output shaft 40 travels in the axial direction linearly without turning or with less than one turn when the rotor assembly 20 rotates. In this connection, the stopper pin 24 prohibits or restricts rotation of the output shaft 40 within one turn.

The front end cap 50 is attached to the front end of the stator assembly 10 so as to cover the hollow of the stator assembly 10 housing the rotor assembly 20. The front end cap 50 has a round center hole 51, and the output shaft 40 is inserted through the center hole 51 so as to have its front end portion sticking out from the front end cap 50. The front end cap 50 has a circular recess 52 coaxial with the center hole 51, and has a groove 53 extending parallel to the length of the output shaft 40. The recess 52 receives a front ball bearing 54 fitted thereinto, which rotatably supports the front end portion of the rotor assembly 20. The aforementioned stopper pin 24 is lodged in and guided by the groove 53 so as to prohibit or restrict rotation of the output shaft 40, and to restrict the frontward travel amount of the output shaft 40, and, in some cases, the rearward travel amount thereof as well.

In the above described linear actuator of FIG. 3, when current is caused to flow in the windings 11, 14, the pole teeth of the stator assembly 10 are excited thereby rotating the rotor assembly 20 due to magnetism of the rotor magnet 21 having magnetic poles. When the rotor assembly 20 rotates, the rotational movement of the rotor assembly 20 is converted into linear movement of the output shaft 40 by means of the female screw 23 of the rotor assembly 20 threadedly engaging with the male screw 41 of the output shaft 40. The output shaft 40 travels in a reciprocating manner within the length of the groove 53 in response to the rotational direction of the rotor assembly 20. The output shaft 40 stops and reverses its movement when the rotor assembly 20 stops and reverses its rotation.

The linear actuator above described may encounter troubles incurred when the output shaft 40 stops its movement, that is, when the rotor assembly 20 is caused to stop its rotation. The male screw 41 of the output shaft 40 has a predetermined length defined by its proximal end portion 41a, and in some linear actuators in which the rearward travel amount of the output shaft 40 is restricted by the proximal end portion 41a, the rotor assembly 20 is caused to stop its rotation when the proximal end portions 41a of the male screw 41 touches the female screw 23. In this case, the thread of the female screw 23 may possibly bite into the proximal end portion 41a depending on the magnitude of inertial force of the rotation of the rotor assembly 20 at the time of touching, which, depending on the degree of the biting, can cause a critical problem that the rotor assembly 20 will not start off its rotation in the reversed direction therefore failing to move the output shaft 40. On the other hand, if the length of the male screw 41 is increased to keep off the screw biting problem, the output shaft 40 is caused to stop its rearward movement when the stopper pin 24 touches the front end of the rotor assembly 20 or the inner ring of the front ball bearing 54. In this case, since the touching area of the stopper pin 24 therewith is positioned outside the pitch diameter of the female and male screws 23, 41, an extra torque is required for the rotor assembly 20 to duly start its rotation in the reversed direction thus, in the worst case, making it possibly happen that the rotor assembly 20 will not start off its rotation.

A linear actuator to address the above problems is disclosed in Unexamined Japanese Patent Application KOKAI Publication No. H06-335228 and will be explained below based on reference numbers in FIG. 3. The linear actuator disclosed therein has a pointed stopper disposed at the center of the cavity 31 of the rear end cap 30. In the linear actuator, the output shaft 40 is caused to stop its rearward movement when the rear end surface of the output shaft 40 touches the pointed stopper. This structure eliminates the two problems described above, specifically one is that the thread of the female screw 23 bites into the proximal end portion 41a of the male screw 41, and the other is that an increased torque is required for the rotor assembly 20 to duly start off its rotation in the reversed direction. However, since the stopper has a pointed head, the head of the stopper can possibly be readily worn away or damaged due to the rear end surface of the output shaft 40 repeatedly touching the head. If the head of the stopper is worn away or damaged, the output shaft 40 cannot be stopped precisely at a place originally determined thus failing to perform an accurate control.

SUMMARY OF THE INVENTION

The present invention has been made in light of the above problems, and it is an object of the present invention to provide a linear actuator, in which the rearward movement of an output shaft can be surely and accurately stopped without undergoing malfunction.

In order to achieve the object, according to one aspect of the present invention, a linear actuator comprises a stator assembly, a rotor assembly, an output shaft, a stopper pin, and a stopper member, wherein: the stator assembly is shaped into a cylinder defining a hollow, and includes a plurality of windings, and a plurality of stator yokes each having an array of pole teeth which constitute an inner circumference of the stator assembly, and which are excited by the windings; the rotor assembly is shaped into a hollow-cylinder, is rotatably housed in the hollow of the stator assembly, and includes a ring-shaped magnet which has a plurality of magnetic poles, constitutes an outer circumference of the rotor assembly, and which opposes the pole teeth of the stator assembly with a predetermined distance therebetween, and a female screw disposed at an inner circumference of the rotor assembly; the output shaft is inserted through the rotor assembly, and has a male screw which is formed at a rearward portion thereof, and which engages threadedly with the female screw of the rotor assembly; the stopper pin is fixedly disposed at a frontward portion of the output shaft, and controls axially the mode and amount of movement of the output shaft initiated by rotation of the rotor assembly; and the stopper member is disposed fixedly with respect to the stator assembly, and stops the axial movement of the output shaft without making it happen that the stopper pin which moves with the output shaft touches the rotor assembly.

Consequently, the female screw does not touch the proximal end portion of the male screw therefore eliminating the aforementioned screw biting problem, and the stopper pin does not touch any portion of the rotor assembly therefore not requiring any extra torque for restarting the rotation of the rotor assembly. Also, the stopper member does not have any pointed portion therefore exhibiting little wear and keeping from damage, eventually resulting in a stable and accurate positioning control of the output shaft.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE PREFERRED EMBODIMENTS

First Embodiment

Figure 1:
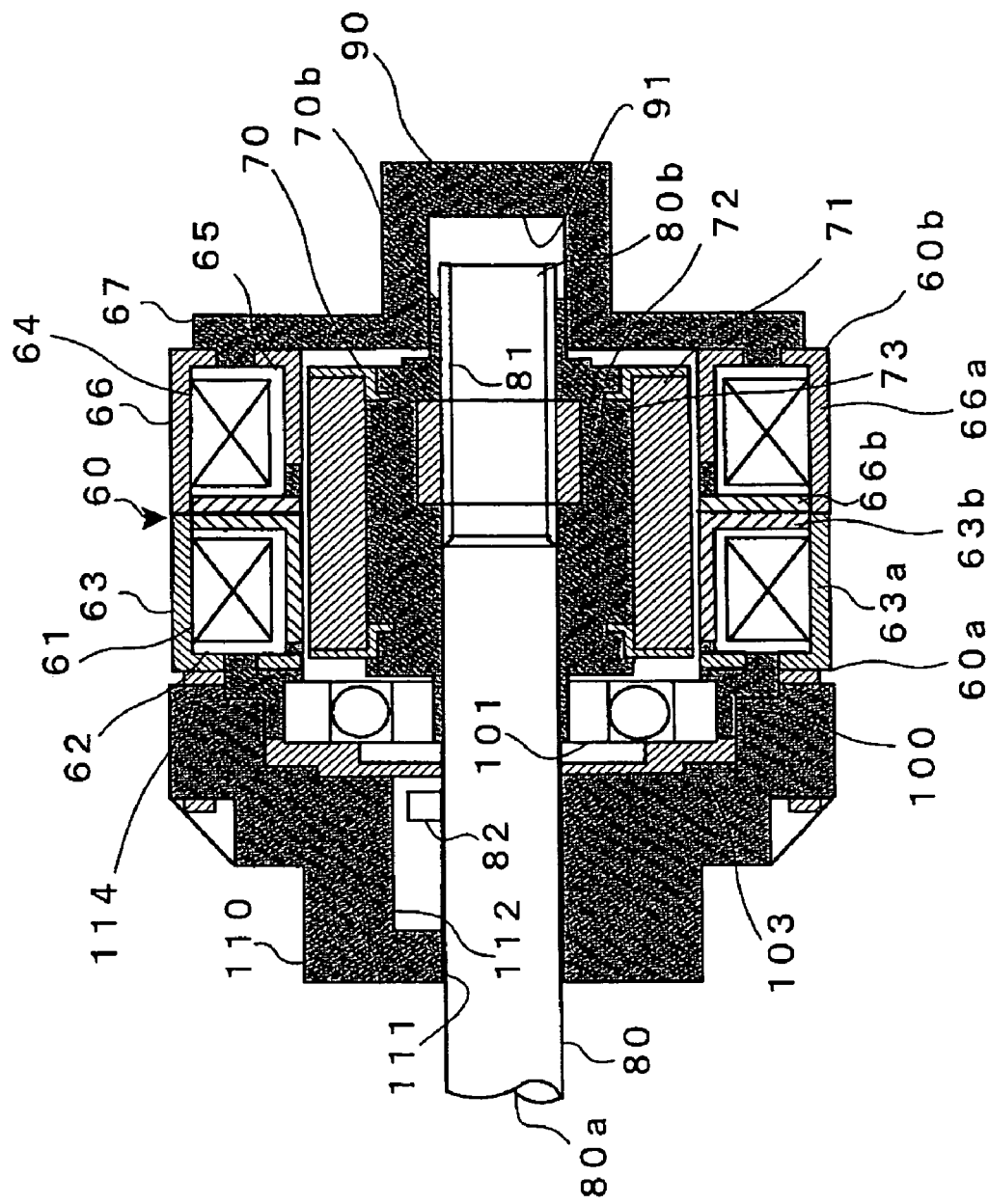
FIG. 1 is a schematic cross sectional view of a linear actuator according to a first embodiment of the present invention.

A linear actuator according to a first embodiment of the present invention will hereinafter be described with reference to FIG. 1. A linear actuator of FIG. 1 generally comprises a stator assembly 60, a rotor assembly 70, an output shaft 80, a rear end cap 90; a front end protrusion 100; and a front end cap 110.

The stator assembly 60 is composed of two stator units 63, 66, one 63 of which is structured such that two stator yokes 63a, 63b shaped into a ring oppose each other so as to sandwich therebetween a bobbin 62 having a winding 61 provided therearound, and the other 66 of which is structured such that two stator yokes 66a, 66b shaped into a ring oppose each other so as to sandwich therebetween a bobbin 65 having a winding 64 provided therearound, and the two stator units 63, 66 structured as above are coaxially stacked on each other forming a hollow-cylinder looking like a doughnut. The two stator yokes 63a, 63b of the stator unit 63 each have an array of pole teeth and are coupled to each other with their respective pole teeth intermeshing with each other. In the same way, the two stator yokes 66a, 66b of the stator unit 66 each have an array of pole teeth and are coupled to each other with their respective pole teeth intermeshing with each other. And, respective pole teeth of the two stator units 63, 66 are appropriately shifted from each other for two-phase driving. The pole teeth constitute the inner circumference of the stator assembly 60. The windings 61, 64 are responsible for exciting the respective pole teeth of the stator units 63, 66. The stator yokes 63a, 63b and 66a, 66b, and bobbins 62, 65 with the windings 61, 64 are integrally fixed together by means of a yoke support member 67 which is formed of resin by injection-molding.

The rotor assembly 70 is housed in the stator assembly 60. The rotor assembly 70 is composed of a rotor magnet 71, a resin segment 72, and a female screw 73, and is shaped into a hollow-cylinder. The rotor magnet 71 is shaped in a ring, has a plurality of magnetic poles, and constitutes the outer circumference of the rotor assembly thus opposing the pole teeth of the stator assembly 60 with a predetermined gap therebetween. The resin segment 72 is shaped tube-like, and disposed inside the rotor magnet 71, and the female screw 73 is attached inside the resin segment 72 by means of resin injection-molding.

The rear end cap 90 is positioned at a rear end face 60b of the stator assembly 60 and covers the hollow of the stator assembly 60. The rear end cap 90 is formed of resin simultaneously and integrally with the yoke support member 67 by resin injection-molding. The rear end cap 90 has a cavity 91 at its inner side facing the rotor assembly 70. The cavity 91 constitutes a sleeve bearing and supports rotatably a rear end portion 70b of the rotor assembly 70. The cavity 91 is not necessarily configured as shown in FIG. 1 but may alternatively be configured so as to receive a ball bearing fitted thereinto for rotatably supporting the rotor assembly 70.

The output shaft 80 is shaped round in its cross section, has a male screw 81 formed at a portion toward a rear end 80b thereof, has a stopper pin 82 disposed at a portion toward a front end 80a, and has its rearward portion inserted through the rotor assembly 70. The male screw 81 engages threadedly with the female screw 73 of the rotor assembly 70, whereby the output shaft 80 travels in the axial direction linearly without turning or with less than one turn when the rotor assembly 70 rotates. In this connection, the stopper pin 82 prohibits or restricts rotation of the output shaft 80 within one turn.

The front end protrusion 100 is shaped into a ring and positioned at a front end face 60a of the stator assembly 60. The front end protrusion 100 is formed of resin simultaneously and integrally with the yoke support member 67 and also with the rear end cap 90 by resin injection-molding. The front end protrusion 100 has an inner diameter larger than the inner diameter of the stator assembly 60, and has a front ball bearing 101 fitted thereinto. A portion of the resin segment 72 of the rotor assembly 70 is fixedly fitted into the inner ring of the front ball bearing 101, whereby the front end portion of the rotor assembly 70 is rotatably supported.

The front end protrusion 100 has a stopper member 103 attached to its frontward portion. The stopper member 103 is shaped into a disk, has a center hole for inserting the output shaft 80, and has a circular recess formed at its inner side facing the front ball bearing 101. The recess of the stopper member 103 defines a diameter larger than an outer diameter of the inner ring of the front ball bearing 101 thereby forming a clearance from the inner ring so as not to block the rotation of the rotor assembly 70. In the structure described above, the output shaft 80 is caused to stop its rearward movement when the stopper pin 82 of the output shaft 80 touches the stopper member 103.

The front end cap 110 is attached by means of a metal fitting 114 to the front end face 60a of the stator assembly 60 so as to cover the hollow of the stator assembly 60 housing the rotor assembly 70. The front end cap 110 has a round center hole 111, and the output shaft 80 is inserted through the center hole 111 so as to have its front end portion (toward the front end 80a) sticking out from the front end cap 110. The front end cap 110 has a groove 112 extending parallel to the length of the output shaft 80. The aforementioned stopper pin 82 is lodged in and guided by the groove 112 so as to prohibit or restrict rotation of the output shaft 80 and to restrict the travel distance of the output shaft 80.

The actuation of the linear actuator of FIG. 1 will be discussed. Current is caused to flow in the windings 61, 64 so as to excite the respective pole teeth of the stator units 63, 66, whereby the rotor assembly 70 is caused to rotate due to magnetism from the rotor magnet 71. When the rotor assembly 70 rotates, the output shaft 80 is caused to move in the axial direction by means of the female screw 73 of the rotor assembly 70 threadedly engaging with the male screw 81 of the output shaft 80. In this connection, the stopper pin 82 moves along the groove 112 while prohibiting or restricting the rotation of the output shaft 80. The stopper pin 82 moves rearward together with the output shaft 80 moving rearward, and the output shaft 80 stops its movement when the stopper pin 82 touches the stopper member 103.

As described above, the linear actuator according to the first embodiment of the present invention includes the stopper member 103, and the output shaft 80 is caused to stop its rearward movement when the stopper pin 82 touches the stopper member 103. Thus, the female screw 73 does not touch the proximal end portion of the male screw 81 therefore eliminating the aforementioned screw biting problem, and the stopper pin 82 does not touch any portion of the rotor assembly 70 or the inner ring of the front ball bearing 101 therefore not requiring any extra torque for restarting the rotation of the rotor assembly 70. Also, the stopper member 103 does not have any pointed portion therefore exhibiting little wear and keeping off damage, eventually resulting in a stable and accurate positioning control of the output shaft 80.

Second Embodiment

A linear actuator according to a second embodiment of the present invention will be described with reference to FIG. 2. In FIG. 2, like reference numerals refer to like elements in FIG. 1.

The linear actuator according to the second embodiment differs from the first embodiment principally in bearing type, and in stopper member structure. Specifically, in the first embodiment, the front and rear end portions of the rotor assembly 70 are rotatably supported respectively by the ball bearing 101 and the cavity 91 constituting a sleeve bearing, and the stopper member 103 is attached to the front end protrusion 100. On the other hand, in the second embodiment, the front and rear end portions of a rotor assembly are rotatably supported respectively by a sleeve bearing and a ball bearing (reversed compared with the first embodiment), and a stopper member is constituted by a portion of the sleeve bearing which rotatably supports the front end portion of the rotor assembly.

Figure 2:
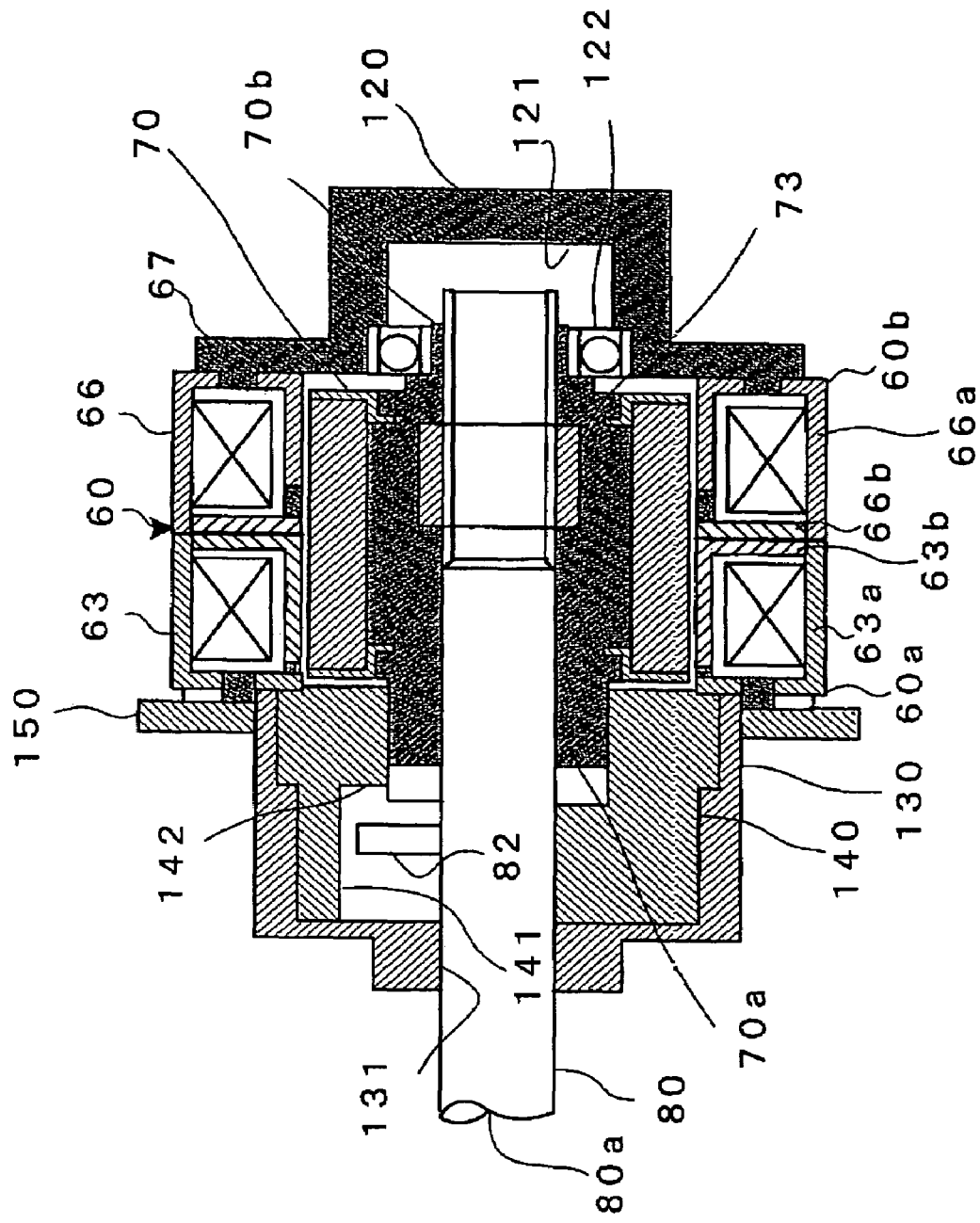
FIG. 2 is a schematic cross sectional view of a linear actuator according to a second embodiment of the present invention.
Figure 3:
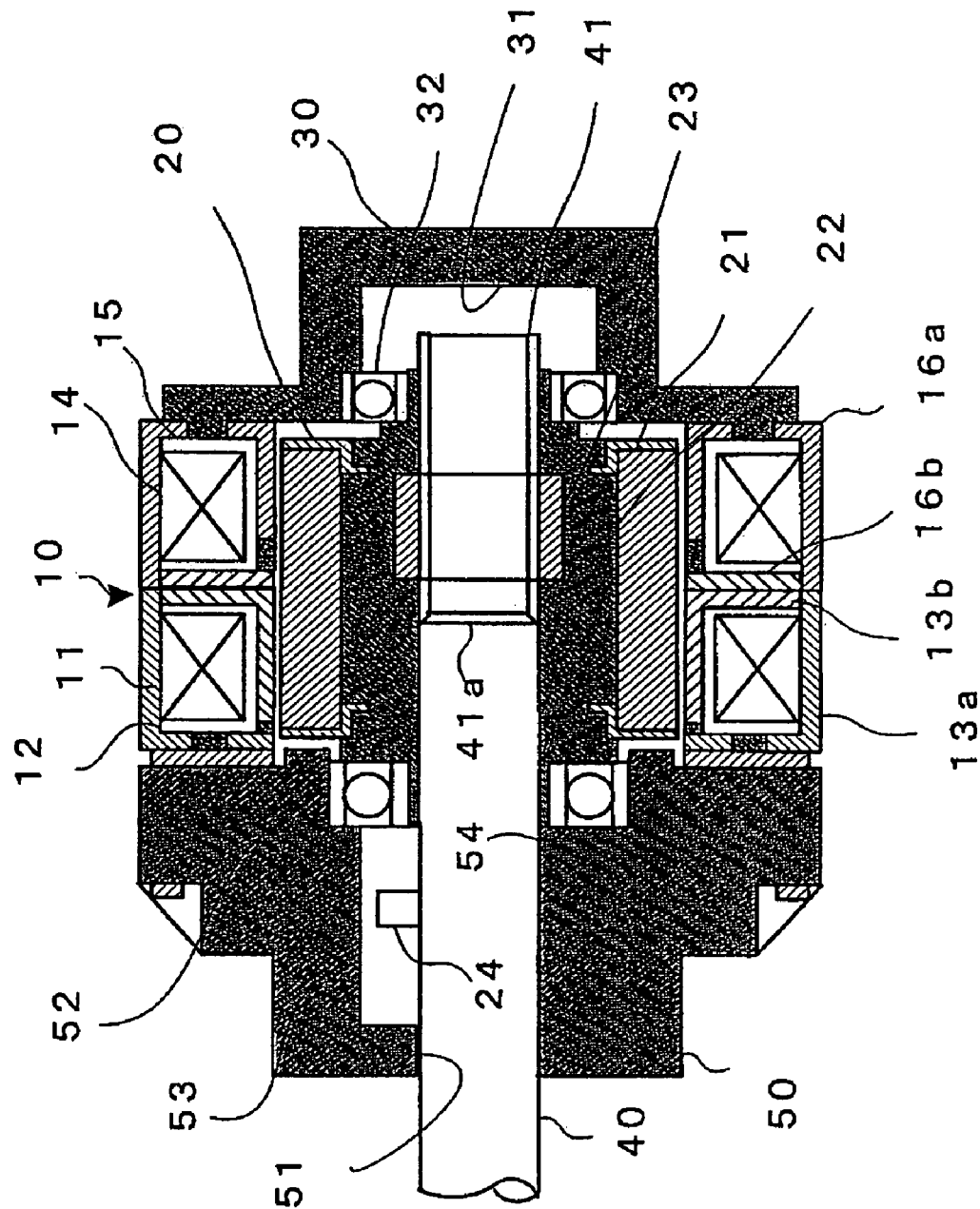
FIG. 3 is a schematic cross sectional view of a conventional linear actuator.

The linear actuator according to the second embodiment shown in FIG. 2 basically comprises a stator assembly 60, a rotor assembly 70, and an output shaft 80, which are of the same structure as the first embodiment shown in FIG. 1.

A rear end cap 120 is disposed at a rear end face 60b of the stator assembly 60 so as to cover the hollow of the stator assembly 60. The rear end cap 120 is formed of resin integrally with a yoke support member 67 by injection-molding, and has a cavity 121 at its inner side facing the rotor assembly 70. The cavity 121 has a circular recess formed coaxially therewith, and a rear ball bearing 122 to rotatably support a rear end 70b of the rotor assembly 70 is fitted into the recess. A front end cap 130 is attached at a front end face 60a of the stator assembly 60 so as to cover the hollow of the stator assembly 60 housing the rotor assembly 70. The front end cap 130 defines a cavity at its inner side facing the rotor assembly 70, and has a round center hole 131. A sleeve bearing 140 is fitted into the cavity of the front end cap 130 and supports rotatably a front end portion 70a of the rotor assembly 70, and the output shaft 80 is inserted through the center hole 131 so as to have its front end portion (toward a front end 80a) sticking out from the front end cap 130. The output shaft 80 is movably inserted through the sleeve bearing 140. The sleeve bearing 140 has a groove 141 formed at its inner circumference so as to extend parallel to the length of the output shaft 80. A frontward end of the groove 141 is open, and the other end is blind so as to constitute a stopper member 142. A stopper pin 82 is lodged in and guided by the groove 141 thereby controlling the movement of the output shaft 80. A front plate 150 may be attached as required.

The linear actuator structured above actuates basically in the same way as the linear actuator of the first embodiment. The output shaft 80 moves linearly when the rotor assembly 70 rotates. The stopper pin 82 fixedly disposed at the output shaft 80 also moves linearly along the groove 141 while prohibiting or restricting the rotation of the output shaft 80. When the output shaft 80 moves rearward, the stopper pin 82 moves also rearward, and the output shaft 80 stops its movement upon the stopper pin 82 touching the stopper member 142.

As described above, the linear actuator according to the second embodiment of the present invention includes the stopper member 142, and the rotor assembly 70 is caused to stop its linear movement when the stopper pin 82 touches the stopper member 142. Thus, the female screw 73 does not touch the proximal end portion of the male screw 81 therefore eliminating the aforementioned screw biting problem, and the stopper pin 82 does not touch any portion of the rotor assembly 70 therefore not requiring any extra torque for duly restarting the rotation of the rotor assembly 70. Also, the stopper member 142 does not have any pointed portion therefore exhibiting little wear and keeping from damage, eventually resulting in a stable and accurate positioning control of the output shaft 80.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

This application is based on Japanese Patent Application No. 2003-50097 filed on. Feb. 26, 2003 and including specification, claims, drawings and summary. The disclosure of the above Japanese Patent Application is incorporated herein by reference in its entirety.

What is claimed is:

1. A linear actuator, comprising:
   a stator assembly shaped into a cylinder defining a hollow, the stator assembly including
      a plurality of windings,
      a plurality of stator yokes each having an array of pole teeth which constitute an inner circumference of the stator assembly, and which are excited by the windings, and
      a yoke support member formed of resin by injection-molding, and integrally supporting the windings and the stator yokes;
   a housing disposed at a front end of the stator assembly;
   a rear end cap disposed at a rear end of the stator assembly, the rear end cap being formed of resin simultaneously and integrally with the yoke support member;
   a rotor assembly shaped into a hollow-cylinder, and rotatably housed in the hollow of the stator assembly, the rotor assembly including
      a ring-shaped magnet having a plurality of magnetic poles, constituting an outer circumference of the rotor assembly, and opposing the pole teeth of the stator assembly with a predetermined distance therebetween, and
      a female screw disposed at an inner circumference of the rotor assembly;
   an output shaft having a male screw formed at a rearward portion thereof and threadedly engaging with the female screw of the rotor assembly, the output shaft being inserted through the rotor assembly;
   a stopper pin secured to the output shaft, and axially controlling mode and amount of movement of the output shaft initiated by rotation of the rotor assembly; and
   a bearing member fitted inside the housing for rotatably supporting the rotor assembly, the bearing member having a groove formed at its inner circumference so as to extend parallel to the length of the output shaft with one end of the groove being blind so as to constitute a stopper member positioned between the stopper pin and the rotor assembly in an axial direction.

2. The linear actuator according to claim 1, wherein the bearing member functions as a sleeve bearing.

3. The linear actuator according to claim 1, wherein a bearing is provided in the rear end cap for rotatably supporting the rotor assembly.

* * * * *